United States Patent
Hixson-Goldsmith et al.

(10) Patent No.: US 9,805,747 B2
(45) Date of Patent: Oct. 31, 2017

(54) METHOD FOR MAKING A PERPENDICULAR MAGNETIC RECORDING WRITE HEAD WITH WRITE POLE HAVING THIN SIDE GAPS AND THICKER LEADING GAP

(71) Applicant: HGST Netherlands B.V., Amsterdam (NL)

(72) Inventors: April D. Hixson-Goldsmith, San Jose, CA (US); Ning Shi, San Jose, CA (US); Kyusik Shin, Pleasanton, CA (US); Suping Song, Fremont, CA (US); Brian R. York, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 252 days.

(21) Appl. No.: 14/827,705

(22) Filed: Aug. 17, 2015

(65) Prior Publication Data

US 2017/0053668 A1    Feb. 23, 2017

(51) Int. Cl.
*C23C 14/00*     (2006.01)
*G11B 5/31*      (2006.01)
*G11B 5/127*     (2006.01)
*G11B 5/23*      (2006.01)

(52) U.S. Cl.
CPC .......... *G11B 5/3163* (2013.01); *G11B 5/1278* (2013.01); *G11B 5/232* (2013.01); *G11B 5/315* (2013.01); *G11B 5/3116* (2013.01)

(58) Field of Classification Search
CPC . C23C 14/0021; C23C 14/14; C23C 14/3435; C23C 16/45525
See application file for complete search history.

(56) References Cited

U.S. PATENT DOCUMENTS

| | | | |
|---|---|---|---|
| 6,077,779 A * | 6/2000 | Shue | C23C 14/046 257/E21.169 |
| 6,954,340 B2 | 10/2005 | Shukh et al. | |
| 7,649,712 B2 | 1/2010 | Le et al. | |
| 8,031,433 B2 | 10/2011 | Yan et al. | |
| 8,542,461 B2 | 9/2013 | Bai et al. | |
| 8,570,686 B2 | 10/2013 | Hosomi et al. | |
| 8,670,213 B1 | 3/2014 | Zeng et al. | |

(Continued)

OTHER PUBLICATIONS

Josell, D., et al., "Seedless Superfill: Copper Electrodeposition in Trenches with Ruthenium Barriers". Electrochemical and Solid-State Letters, 6 (10) C143-C145 (2003).*

(Continued)

*Primary Examiner* — Bret Chen
(74) *Attorney, Agent, or Firm* — Thomas R. Berthold

(57) ABSTRACT

Ionized physical vapor deposition (IPVD) is used to form a magnetic recording disk drive write head main pole with thin side gap layers and a thicker leading gap layer. A metal or metal alloy is formed by IPVD in a trench with a bottom and outwardly sloping sidewalls. An optional Ru seed layer is deposited on the metal or metal alloy. This is followed by atomic layer deposition (ALD) of a Ru smoothing layer. If the IPVD results in metal or metal alloy side gap layers with a rough surface, the ALD process is modified, resulting in a smooth Ru smoothing layer that does not replicate the rough surface of the side gap layers.

12 Claims, 8 Drawing Sheets

(56) References Cited

U.S. PATENT DOCUMENTS

| | | | |
|---|---|---|---|
| 8,730,617 B1 | 5/2014 | Hsiao et al. | |
| 8,760,804 B2 | 6/2014 | Brinkman et al. | |
| 8,861,137 B1 | 10/2014 | Lam et al. | |
| 8,941,948 B2 | 1/2015 | Etoh et al. | |
| 8,988,824 B1 | 3/2015 | Brinkman et al. | |
| 2005/0236181 A1* | 10/2005 | Chen | H01L 21/76807 174/256 |
| 2006/0006136 A1* | 1/2006 | Mosden | H01L 21/0276 216/37 |
| 2007/0235321 A1* | 10/2007 | Cerio, Jr. | C23C 14/046 204/192.15 |
| 2008/0157126 A1* | 7/2008 | Bertin | B82Y 10/00 257/209 |
| 2009/0321247 A1* | 12/2009 | Cerio, Jr. | C23C 14/025 204/192.11 |
| 2011/0094888 A1* | 4/2011 | Chen | C25D 5/02 205/81 |
| 2013/0309863 A1* | 11/2013 | Lin | H01L 21/76843 438/653 |
| 2014/0272120 A1 | 9/2014 | Shi et al. | |

OTHER PUBLICATIONS

Karabacak, Tansel, et al., "Enhanced step coverage by oblique angle physical vapor deposition." Journal of Applied Physics 97, 124504 (2005).*

Lu, Junqing, et al., "Trench filling by ionized metal physical vapor deposition". J. Vac. Sci. Technol. A 19(5), Sep./Oct. 2001, pp. 2652-2663.*

Helmersson, Ulf, et al., "Review: Ionized physical vapor deposition (IPVD): A review of technology and applications". Thin Solid Films 513 (2006) 1-24.*

Helmersson et al., "Ionized Physical Vapor Deposition (IPVD): A Review of Technology and Applications", Thin Solid Films, (513), 1-2, 1-24. http://dx.doi.org/10.1016/j.tsf.2006.03.033, 2006.

Minjauw et al., "Atomic layer deposition of ruthenium at 100 ° C. using the RuO4-precursor and H2", J. Mater. Chem. C, 2015, 3, 132-137.

* cited by examiner

METHOD FOR MAKING A PERPENDICULAR MAGNETIC RECORDING WRITE HEAD WITH WRITE POLE HAVING THIN SIDE GAPS AND THICKER LEADING GAP

BACKGROUND OF THE INVENTION

Field of the Invention

This invention relates generally to perpendicular magnetic recording systems, and more particularly to perpendicular magnetic recording write heads for use in magnetic recording disk drives.

Description of the Related Art

In a perpendicular magnetic recording system like a magnetic recording hard disk drive, the recorded bits are stored in a perpendicular or out-of-plane orientation in the recording layer. The recording or write head in perpendicular magnetic recording disk drives includes a write pole comprising a shaped pole and a main pole for writing to the recording layer, and one or more return poles for return of magnetic flux from the recording layer.

The main pole is typically formed by electroplating a high moment magnetic material, the most common example being iron-cobalt (FeCo) alloys. The main pole is typically surrounded by side shields, a trailing shield and a leading shield but separated from the shields by nonmagnetic gap layers. To form the main pole, in one technique referred to as the Damascene process, a generally trapezoidal shaped trench with outwardly sloped sidewalls is formed in a substrate. A metallic material like Ru is deposited in the trench to serve as the bottom leading gap layer and side gap layers for the main pole. The main pole may be electroplated onto a pole seed layer, such as a NiCr/FeCo bilayer, which is known to produce the soft magnetic property (low coercivity) desirable for the subsequently electroplated FeCo main pole; or by directly plating onto the metallic gap if the main pole magnetic properties are acceptable.

As the data track density increases in disk drives it is desirable to decrease the thickness of the side gap layers. However, current processes to decrease the side gap layer thickness also reduce the thickness of the leading gap layer, which can lead to an undesirable increase in the shunting of magnetic flux through the leading gap layer to the leading shield.

What is needed is a method for making a perpendicular magnetic recording write head with a main pole that has thin side gap layers and a substantially thicker bottom leading gap layer.

SUMMARY OF THE INVENTION

In embodiments of the method of this invention, ionized physical vapor deposition (IPVD) is used to form a main pole with thin side gap layers and a thicker leading gap layer. A metal or metal alloy, for example a NiNb, NiTa or NiCr alloy, is formed by IPVD in a trench with a bottom and outwardly sloping sidewalls. In one embodiment a Ru seed layer is deposited on the metal or metal alloy. This is followed by atomic layer deposition (ALD) of a Ru smoothing layer. The Ru can be deposited directly onto the metal by ALD without a seed layer if the ALD mechanism is not hindered by the underlying metal substrate. If the IPVD results in metal or metal alloy side gap layers with a rough surface, the ALD process is modified, resulting in a smooth Ru smoothing layer that does not replicate the rough surface of the side gap layers. In an alternative embodiment an alumina ($Al_2O_3$) gap layer is deposited on the metal or metal alloy by ALD. After the Ru or alumina roughness-abating layer for the gap is formed, a metallic pole seed layer is deposited and the magnetic material of the main pole, typically FeCo, is electroplated into the trench.

For a fuller understanding of the nature and advantages of the present invention, reference should be made to the following detailed description taken together with the accompanying figures.

DETAILED DESCRIPTION OF THE INVENTION

Figure 1:
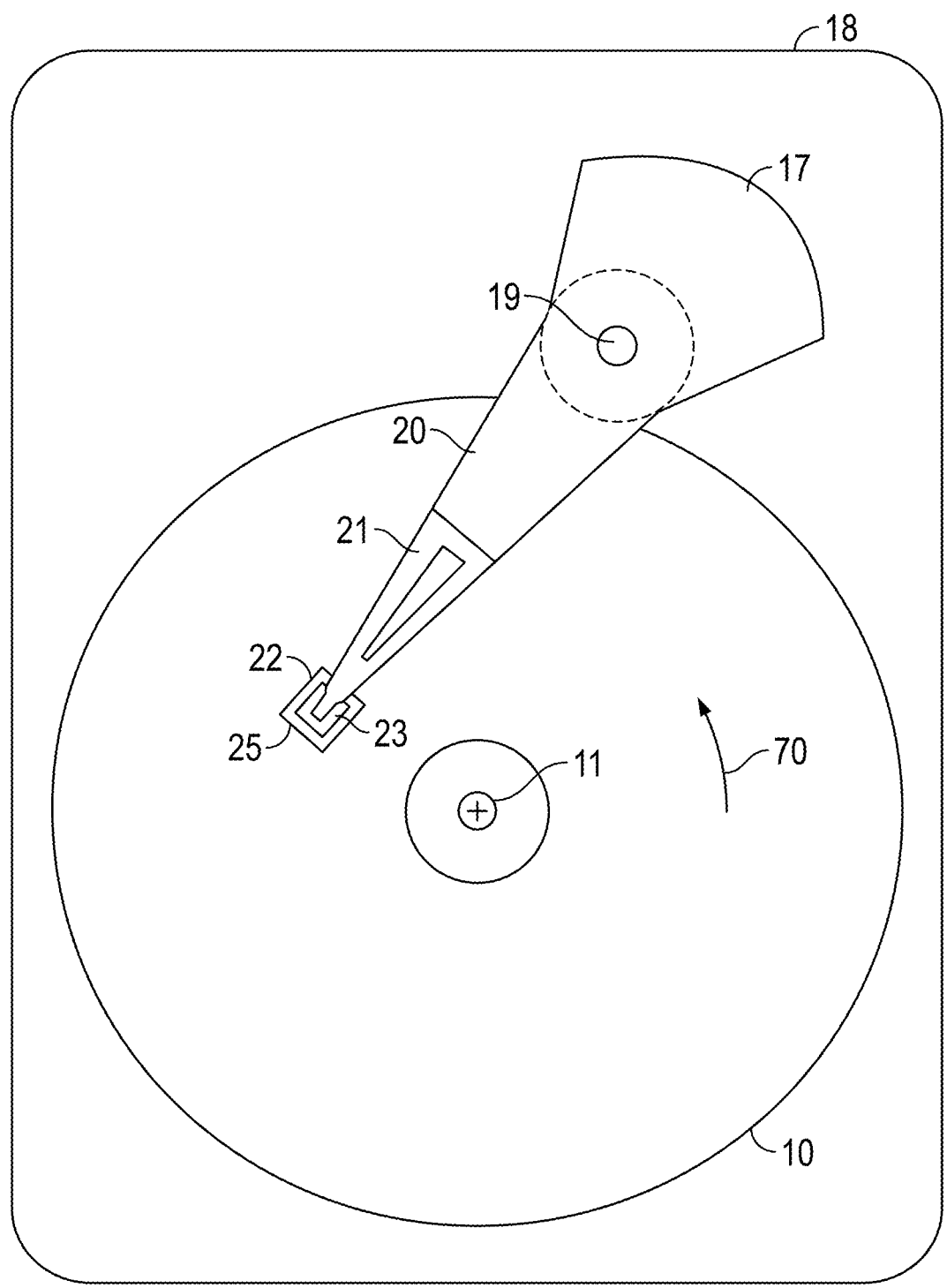
FIG. 1 is a schematic top view of a conventional magnetic recording hard disk drive with the cover removed.

FIG. 1 is a block diagram of a conventional magnetic recording hard disk drive with the cover removed. The disk drive includes a magnetic recording disk 10 and a rotary voice coil motor (VCM) actuator 17 supported on a disk drive housing or base 18. The disk 10 has a magnetic recording layer (RL) with generally concentric data tracks. The disk 10 has a center of rotation 11 and is rotated in direction 70 by a spindle motor (not shown) mounted to base 18. The actuator 17 pivots about axis 19 and includes a rigid actuator arm 20. A generally flexible suspension 21 includes a flexure element 23 and is attached to the end of arm 20. A head carrier or air-bearing slider 22 is attached to the flexure 23. A magnetic recording read/write head (not shown) is formed on the trailing surface 25 of slider 22. The flexure 23 and suspension 20 enable the slider to "pitch" and "roll" on an air-bearing generated by the rotating disk 10. Typically, there are multiple disks stacked on a hub that is rotated by the spindle motor, with a separate slider and read/write head associated with each disk surface.

Figure 2A:
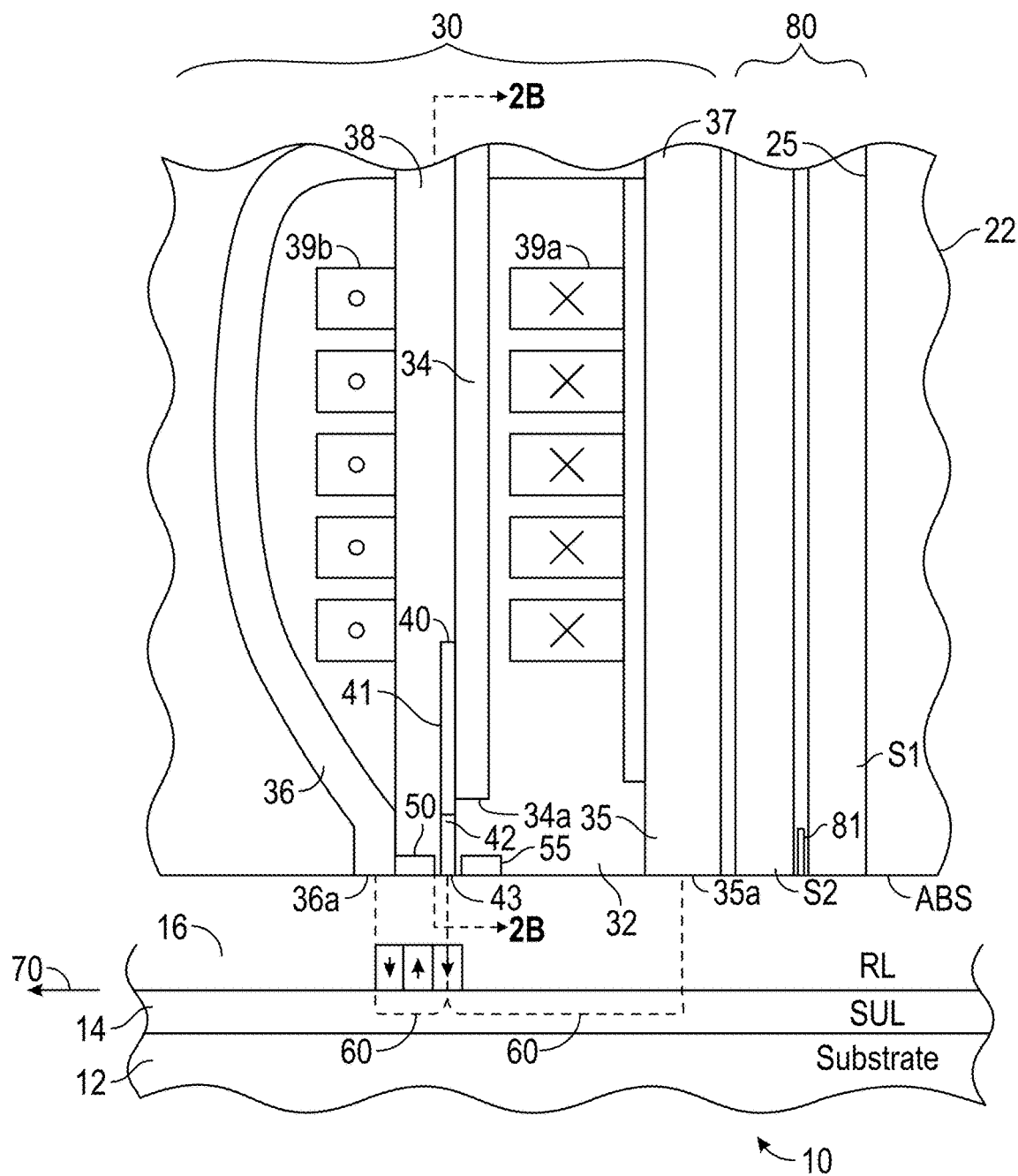
FIG. 2A is a side sectional view of a conventional perpendicular magnetic recording system showing a read head, a write head, and a recording medium taken through a plane parallel to a data track.

FIG. 2A is a side sectional view of a portion of the slider 22 showing a read head 80, a write head 30, and the recording medium (disk 10) with RL 16 taken through a plane parallel to a data track. As shown in FIG. 2A, a "dual-layer" medium 10 includes a perpendicular magnetic data recording layer (RL) 16 on a "soft" or relatively low-coercivity magnetically permeable underlayer (SUL) 14 formed on the disk substrate 12. This type of medium is shown with a magnetoresistive (MR) read head 80 and a single pole type of recording or write head 30 that are shown in a section taken through a plane parallel with a data track on RL 16. The MR read head 80 includes the MR sensor 81 located between MR shields S1, S2.

The write head 30 includes a yoke made up of the shaped pole 34, also referred to as P2, a first flux return pole 35, also referred to as P1, a yoke stud 37 connecting the shaped pole 34 and first return pole 35, a second flux return pole 36, also referred to as P3, a yoke stud 38 connecting the shaped pole 34 and second flux return pole 36, and a thin film coil 39a, 39b shown in section around shaped pole 34. The coil 39a, 39b is depicted as a helical coil wrapped around shaped pole 34, but the coil may also be a well-known "pancake" coil wherein the coil is wrapped around the yoke and the coil segments lie in substantially the same plane. A flared main-pole (MP) 40 is formed over the shaped pole 34 and has a flared portion 41 and a pole tip portion 42 with a pole tip end 43 that faces the outer surface of disk 10. Insulating material 32, typically alumina, separates the coil 39a, 39b from the shaped pole 34 and MP 40. Write current through coil 39a, 39b induces a magnetic field (shown by dashed line 60) from the MP 40 that passes through the RL 16 to write to the RL 16 by magnetizing the region of the RL 16 beneath the MP 40. The magnetic field 60 is directed from the RL 16 through the flux return path provided by the SUL 14, and back to the flux return poles 35, 36. The read head 80 and write head 30 are formed as a series of films deposited on the trailing surface 25 of slider 22. Slider 22 has an air-bearing surface (ABS) that faces the disk 10. The pole tip end 43 is located substantially at the ABS, and the first and second return poles, 35, 36 have ends 35a, 36a, respectively, that are located substantially at the ABS and thus generally coplanar with pole tip end 43. The shaped pole 34, on which MP 40 is formed, has an end 34a that is recessed from the ABS. In FIG. 2A the disk 10 moves past the recording head in the direction indicated by arrow 70. The RL 16 is illustrated with perpendicularly recorded or magnetized regions, with adjacent regions having opposite magnetization directions, as represented by the arrows. The magnetic transitions between adjacent oppositely directed magnetized regions are detectable as resistance changes by the MR sensor 81 as the recorded bits. FIG. 2A also illustrates a leading shield (LS) 55 and a trailing shield (TS) 50. TS 50 forms part of a "wraparound" shield that includes side shields (not shown) and is described in more detail in FIGS. 2B-2C.

Figure 2B:
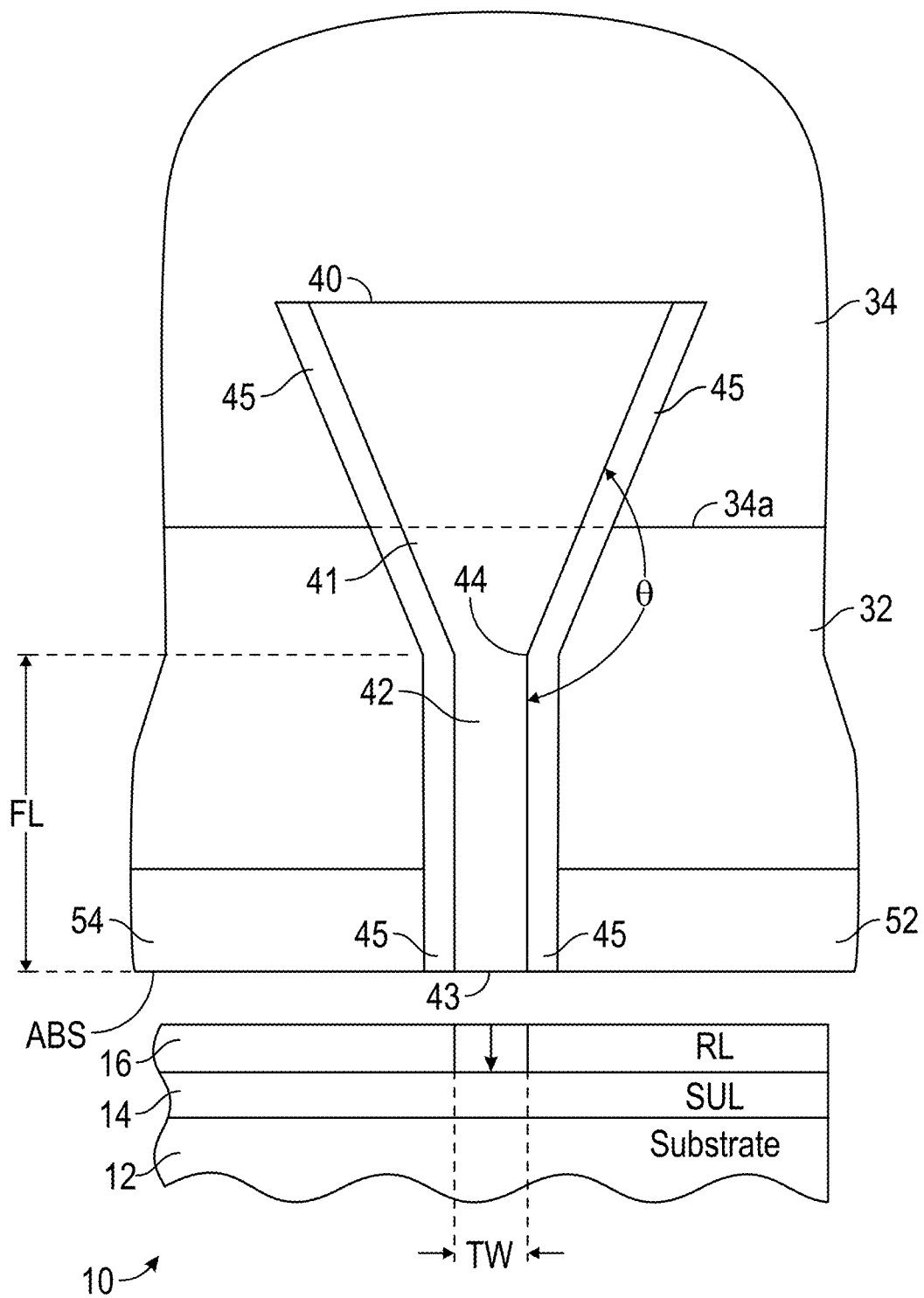
FIG. 2B is a view in the direction 2B-2B of FIG. 2A and illustrates the width of the main pole (MP) to substantially define the trackwidth (TW) of the data recorded in the recording layer (RL).

FIG. 2B is a view in the direction 2B-2B of FIG. 2A. The main pole 40 is formed on a substrate that includes a shaped pole 34, insulating material 32 and side shields 52, 54. Shaped pole 34 has its end 34a recessed from the ABS, and better illustrates the flare region 41 of flared MP 40. The region between the pole tip portion 42 and the flare portion 41 is called the flare point 44. The flare point 44 of the MP 40 is sometimes referred to as the "choke" point because it is the point where the flux density is highest and where the MP 40 saturates. The MP tip 42 has a "height" from end 43 to flare point 44 called the flare length (FL). As shown in FIG. 2B, the two sidewalls of MP tip 42 define its width in the cross-track direction, which substantially defines the trackwidth (TW) of the data recorded in the RL 16. The region of the MP 40 above the flare region 41 is substantially wider than MP tip 42 below the flare region 41 and the flare point 44 is the transition point where the MP 40 begins to widen with distance from the ABS. The angle θ in FIG. 2B is called the flare angle and is between 90 and 180 degrees, typically between about 120 and 150 degrees. The MP 40 includes nonmagnetic side gap layers 45.

Figure 2C:
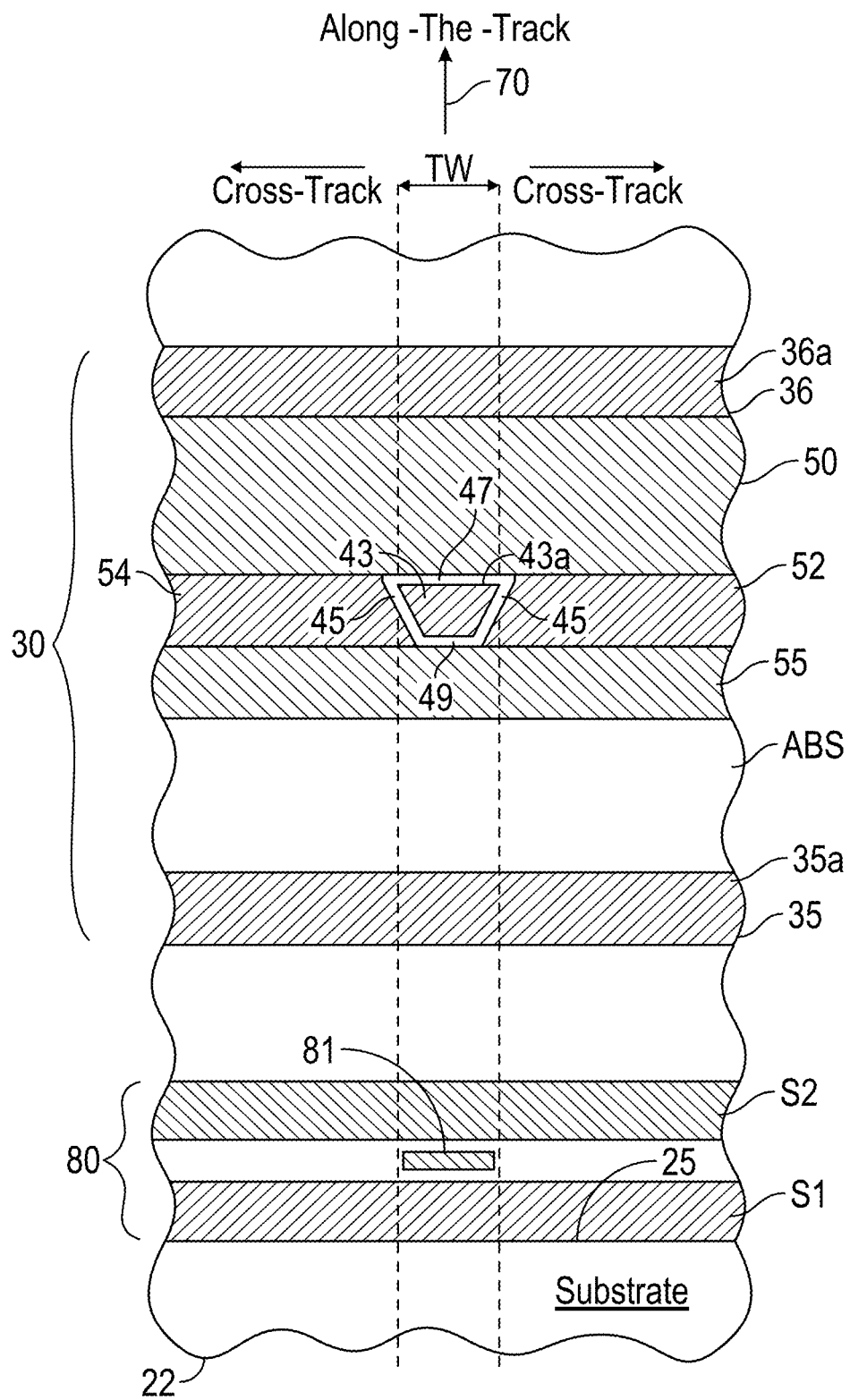
FIG. 2C is a view from the air-bearing surface (ABS) of the prior art write head in FIG. 2A and shows the leading shield, side shields and trailing shield substantially surrounding the MP tip.

FIG. 2C illustrates the write head 30 as seen from the disk 10. The ABS is the recording-layer-facing surface of the slider 22 that faces the medium 10 and is shown in FIG. 2C without the thin protective overcoat typically present in an actual slider. The recording-layer-facing surface shall mean the surface of the slider or head carrier that is covered with a thin protective overcoat, the actual outer surface of the head carrier if there is no overcoat, or the outer surface of the overcoat. The phrase "substantially at the recording-layer-facing surface" shall mean actually at the surface or slightly recessed from the surface. The disk 10 moves relative to the write head 30 in the direction 70, which is called the along-the-track direction. The dashed lines in FIG. 2C represent the sides of a data track. The width of the MP tip 42 substantially defines the track-width (TW) of the data tracks in the RL 16. The MP tip 42 has a generally trapezoidal shape with a trailing edge 43a as a result of the manufacturing process. The direction perpendicular to direction 70 and parallel to the plane of the ABS is called the cross-track direction.

The wraparound shield that includes side shields 52, 54 and TS 50 is described in detail as a shield for a conventional perpendicular recording head in U.S. Pat. No. 7,002,775 B2, assigned to the same assignee as this application. The shields 50, 52, 54 all have ends substantially at the recording-layer-facing surface. The shields 50, 52, 54 are typically connected to one another and substantially surround the MP tip 42 to form a "wraparound" shield. The TS 50 and side shields 52, 54 are separated from MP tip 42 by nonmagnetic gap material, i.e., trailing gap layer 47 and side gap layers 45. It is customary that gap 47 is much thinner than gap 45. The MP tip 42 is also separated from leading shield 55 by nonmagnetic leading gap layer 49. The wraparound shield with shields 50, 52, 54 separated from the MP tip 42 by nonmagnetic gap material alters the angle of the write field and improves the write field gradient at the point of writing, and also shields the RL from the writing field at regions away from the track being written. The wraparound shield is shown as being connected to the return pole 36 but it may also be a "floating" shield, meaning that it is not connected to either the return pole 36 or other portions of the yoke by flux-conducting. The MP tip 42 is also separated from the LS 55 by nonmagnetic gap layer 49. The yoke and shields of write head 30 are formed of soft ferromagnetic material, for example, alloys of two or more of Ni, Fe and Co like NiFe, CoFe and NiFeCo alloys, that are typically formed by electroplating. The shaped pole 34 and MP 40 are formed of a high-moment material, such as a high-moment FeCo alloy with Fe present between 60 and 80 wt. %. The FeCo alloy may comprise just Co and Fe or may contain one or more other elements, such as Ni, Al, Ta, Hf, B, N and C.

FIG. 2C also illustrates the magnetoresistive (MR) read head 80 that includes the MR sensor 81 located between MR shields S1, S2. The films making up MR head 80 and write head 30 as shown in FIG. 2C are formed in succession on a substrate by a series of thin film deposition, etching and lithographic patterning process steps.

The MP 40 is formed by a Damascene process. The MP 40 is typically electroplated into a generally trapezoidal shaped trench that has been formed on the surface of the shaped pole 34, alumina 32 and side shields 52, 54. The bottom of the trench is the LS 55. A metallic material, which is typically ruthenium (Ru), is deposited into the trench to adjust the trench width to the desired MP dimension and to serve as the side gap layers 45 and leading gap layer 49. A pole seed layer, such as a NiCr/FeCo bilayer, may be deposited into the trench prior to plating the MP. The NiCr/FeCo bilayer is known to promote soft magnetic properties desirable for the subsequently electroplated FeCo alloy pole layer. To further improve the soft magnetic properties of the NiCr/FeCo bilayer it can be grown on top of an amorphous underlayer. The amorphous underlayer serves to reset the growth between the Ru layer and the NiCr/FeCo pole seed layer.

As the data track density increases in disk drives it is desirable to decrease the thickness of the side gap layers. However, current processes to decrease the thickness of the side gap layers also reduce the thickness of the leading gap layer, which can lead to an undesirable increase in the shunting of magnetic flux through the leading gap layer to the leading shield. In embodiments of this invention, ionized physical vapor deposition (IPVD) is used to form a MP with thin side gap layers and a thicker leading gap layer. The ratio of the thickness of the bottom leading gap layer to the thickness of the side gap layers is preferably equal to or greater than 1.5. A metal or metal alloy is formed by IPVD in a trench with a bottom and outwardly sloping sidewalls. In one embodiment a Ru seed layer is deposited on the metal or metal alloy followed by atomic layer deposition (ALD) of a Ru smoothing layer. Ru can be deposited directly onto the metal by ALD without a seed layer if the ALD mechanism is not hindered by the underlying metal substrate. The need for the Ru seed layer is dictated by the adhesion properties. If the IPVD results in metal or metal alloy side gap layers with a rough surface, the ALD process is modified, resulting in a smooth Ru smoothing layer that does not replicate the rough surface of the side gap layers. In an alternative embodiment an alumina ($Al_2O_3$) gap layer is deposited on the metal or metal alloy by ALD. After the Ru or alumina roughness-abating layer for the gap is formed, a metallic pole seed layer is deposited and the magnetic material of the MP, typically FeCo, is electroplated into the trench.

Figure 3A:
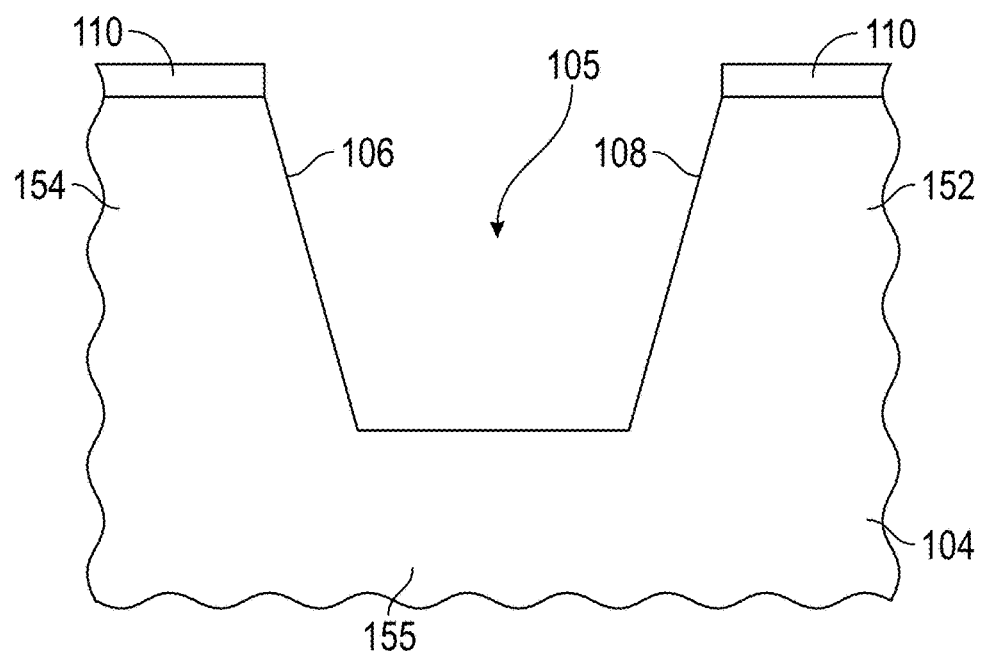
FIGS. 3A-3D are sectional schematic views illustrating a method according to an embodiment of the invention for forming the side gap layers and bottom leading gap layer for the MP.

An embodiment of the method of the invention is illustrated by the sectional schematic views of FIGS. 3A-3D. FIG. 3A illustrates a substrate 104 of soft ferromagnetic material, like alloys of NiFe, FeCo or FeCoNi, that will function as the leading and side shields. Photoresist (not shown) is patterned on substrate 104 above the region where the generally trapezoidal shaped trench 105 is to be formed. Subsequently, a hard mask layer 110, for example NiCr and Ta with a thickness between about 10-100 nm, is deposited on the substrate 104 and over the patterned photoresist. The resist and hard mask material above it are lifted off, followed by a RIE step to form the trench 105 with outwardly sloped sidewalls 106, 108 down to the trench bottom, using the hardmask layer 110 as an etch mask. After the trench is formed the portion of the substrate 104 below the trench is the leading shield 155 and the portions adjacent the sidewalls 106, 108 are the side shields 152, 154 respectively.

Figure 3B:
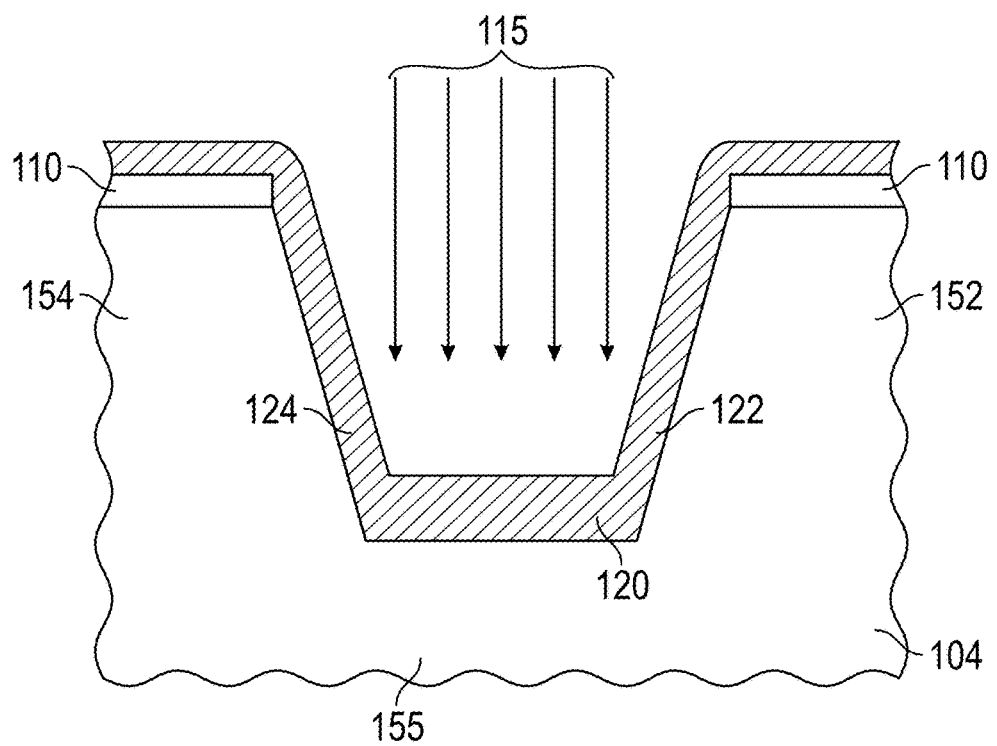

In FIG. 3B, a layer of metal or metal alloy is deposited into the trench by IPVD to form bottom gap layer 120 and side gap layers 122, 124. IPVD is a well-known process. See Ulf Helmersson et al., Ionized Physical Vapor Deposition (IPVD): A Review of Technology and Applications, 2006, *Thin Solid Films*, (513), 1-2, 1-24. Conventional physical vapor deposition (PVD) is a technique where an inert working gas, such as argon, may be ionized and accelerated to a negatively charged target (cathode). The momentum transfer from the impact from the ionized gas ejects neutral atoms from the target. These neutral atoms follow their own trajectories as dictated by the momentum transfers and impact the substrate surface. In IPVD, either the process pressure is so high or there is an external inductively coupled plasma (ICP) RF field that causes the sputtered species to inflict multiple collisions such that they ionize before reaching the substrate surface. At the substrate anode, a bias voltage is either applied or a self-bias is generated. The ionized species will thus be "pulled" to the substrate surface. As a result, IPVD will result in a "collimated" stream of ionized species directed orthogonal to the substrate surface, as shown by arrows 115.

The metal or metal alloy used to form gap layers 120, 122, 124 by IPVD may be any metal or metal alloy with a low ionization energy so that a high degree of ionization can be achieved, i.e., greater than 50 percent of the metal or metal alloy atoms are ionized. Preferably the metal or metal alloy is nonmagnetic. Examples of nonmagnetic metal alloys with low ionization energies include NiNb, NiTa and NiCr. As shown in FIG. 3B, due to the inclined angle of the trench sidewalls and the collimation of the metal or metal alloy ions the bottom gap layer 120 is formed to a substantially greater thickness than the side gap layers 122, 124. This results in a thick leading gap with sidewall gaps thinner than the leading gap. Preferably the ratio of the thickness of the bottom gap layer 120 to the thickness of the side gap layers 122, 124 is equal to or greater than 1.5. The thickness of the side gap layers 122, 124 is preferably in the range of 20-60 nm and the thickness of the bottom gap layer 120 may be at least 1.2 to 3 times greater.

Figure 3C:
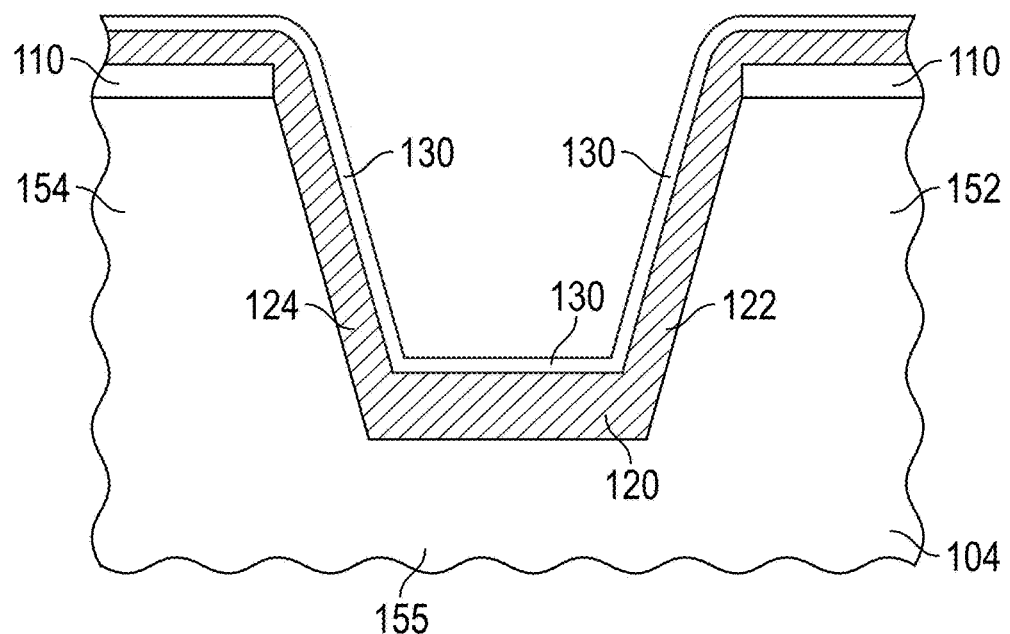

Next, in FIG. 3C an optional Ru seed layer 130 is deposited into the trench over the side gap layer 122, 124 and bottom gap layer 120. The Ru seed layer 130 is preferably deposited by an ion beam sputter deposition to a thickness in the range of about 3-10 nm, or by a conventional PVD with a long target-to-substrate spacing. Such spacing may be 100 mm or longer. The seed layer 130 may only be needed to enhance adhesion.

Figure 3D:
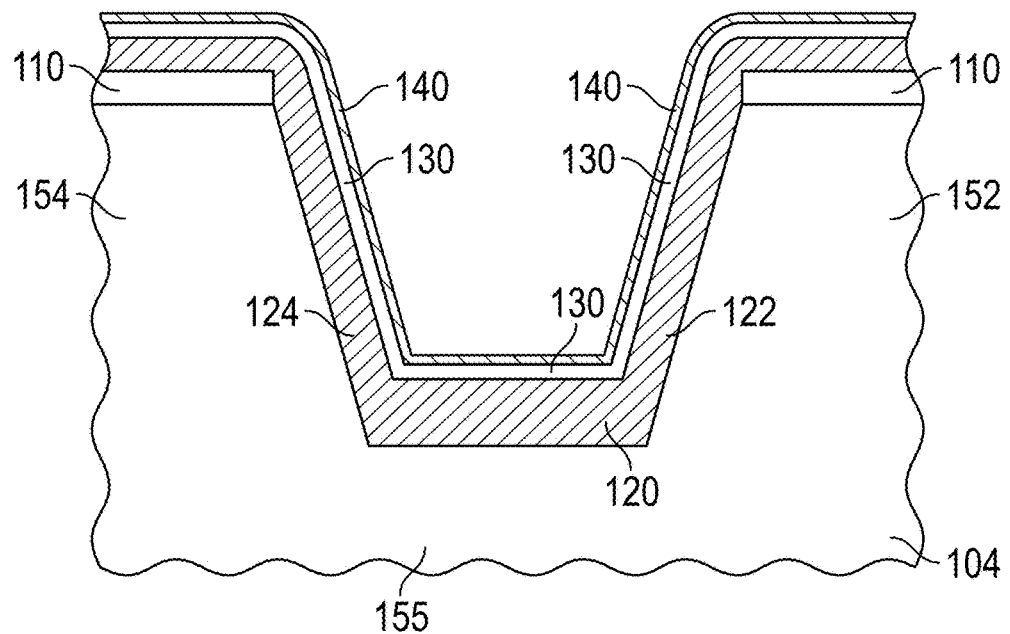

Next, in FIG. 3D a Ru smoothing layer 140 is deposited by atomic layer deposition (ALD) over the Ru seed layer 130, which acts as a catalyst for the ALD of the Ru smoothing layer 140. The Ru seed layer 130 will enhance Ru oxide reduction and therefore adhesion. The Ru smoothing layer 140 is formed to a thickness in the range of about 1-5 nm. Ru ALD is well-known. In one type of Ru ALD a precursor of ruthenium tetroxide ($RuO_4$) vapor blended with a solvent will condense onto a Ru surface and reduce to $RuO_2$ with the Ru surface as a catalyst. Once $RuO_2$ has saturated the Ru surface the reduction of $RuO_4$ slows down substantially. Hydrogen ($H_2$) is then introduced, which reduces the $RuO_2$ to Ru metal. See Minjauw et al., "Atomic layer deposition of ruthenium at 100° C. using the RuO4-precursor and $H_2$", *J. Mater. Chem. C*, 2015, 3, 132-137.

Figure 4A:
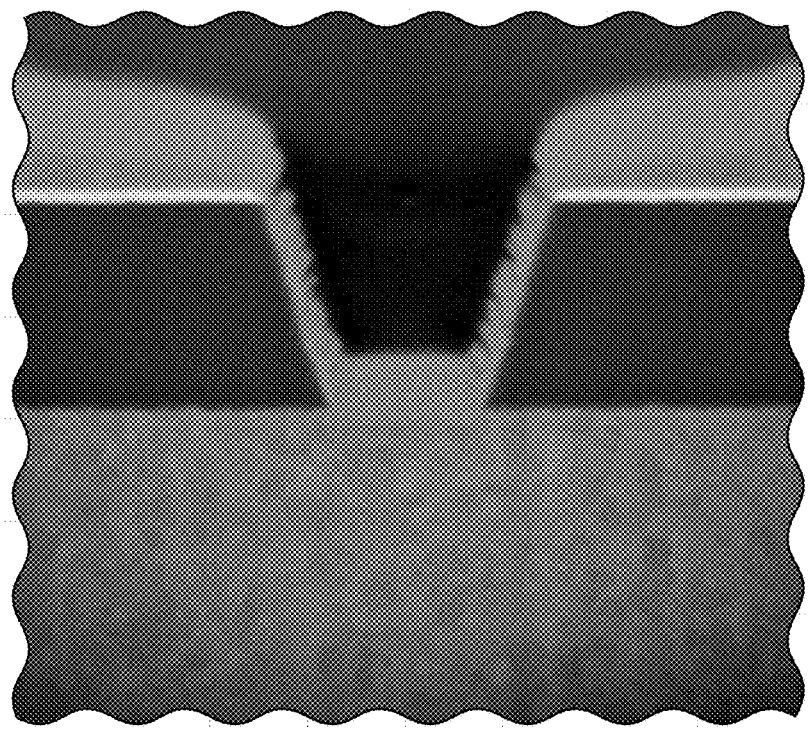
FIG. 4A is a scanning electron microscopy (SEM) image showing the rough surfaces of sidewall gap layers of NiNb formed by ionized physical vapor deposition (IPVD).
Figure 4B:
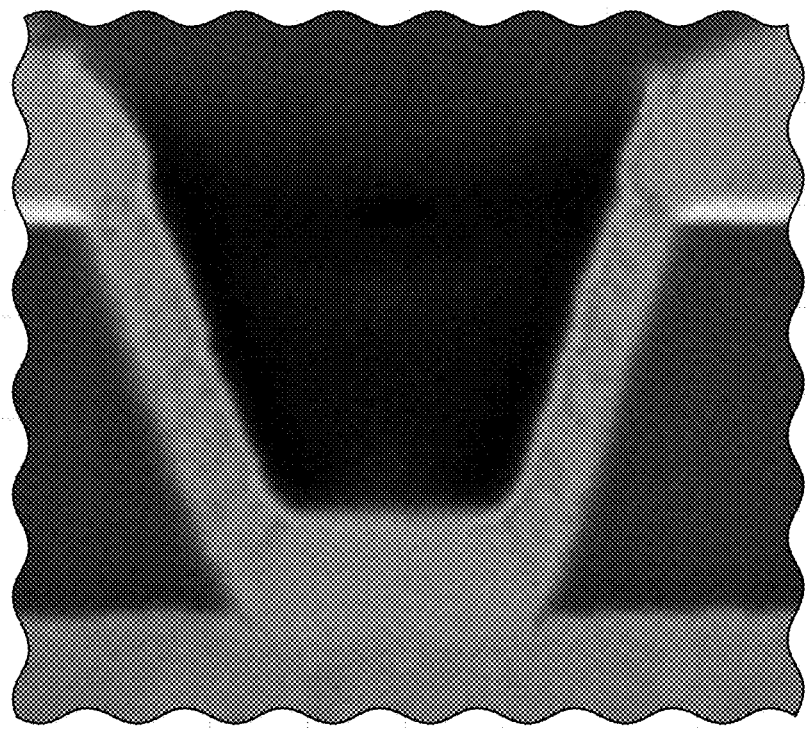
FIG. 4B is a SEM image after the Ru seed layer was deposited on the rough NiNb sidewall surfaces of FIG. 4A and the Ru smoothing layer was deposited by the modified Ru atomic layer deposition (ALD) process according to an embodiment of the invention.

The IPVD of the metal or metal alloy may result in side gap layers 122, 124 with a rough surface, i.e. substantially rougher than the relatively smooth surface of the bottom gap layer 120. This is likely due to the glancing incidence of the metal or metal ions on the sloped sidewalls 122, 124. This is depicted in the scanning electron microscopy (SEM) image of FIG. 4A, which shows the rough surfaces of sidewall gap layers of NiNb formed by IPVD. When the Ru seed layer 130 is deposited it will replicated the rough surfaces of the sidewall gap layers. Thus, in one embodiment of the method of this invention, the conventional Ru ALD process may be modified to improve the smoothing effect of the Ru ALD layer 140. In the conventional Ru ALD process, the process pressure is maintained just at or higher than the $RuO_4$ vapor pressure, which readily supplies $RuO_4$ to reduce to $RuO_2$ in the presence of the Ru catalyst. The process will be at equilibrium in the absence of Ru to prevent excessive condensation. However, the same chemical principle can be used to enhance an opposite effect, i.e., surface smoothing. By tweaking the process pressure slightly higher, or increasing the dwell time longer in the presence of the $RuO_4$, the condensation of $RuO_4$ becomes energetically and kinetically more favorable. In the presence of a rough surface, nucleation energy further reduces, which makes this process regime more of a $RuO_2$ crevice filling process rather than a $RuO_2$ growth-arrest process. Thus the conventional Ru ALD process can be modified for a rough Ru surface by, for example, increasing the $RuO_4$ exposure time from 3 sec to 15 sec and/or by increasing the gas purge time between the $RuO_4$ cycle and the $H_2$ cycle from 3 sec to 15 sec. This allows a minimization of surface energy to take place by the remnant $RuO_4$ liquid phase, and accumulated $RuO_4$ to be fully transformed to $RuO_2$ and then Ru. This creates an effect where crevices will be filled, and the subsequent prolonged $H_2$ cycle will solidify and reduce the $RuO_2$ into metallic Ru. FIG. 4B is a SEM image after the Ru seed layer was deposited on the rough NiNb sidewall surfaces of FIG. 4A and the Ru smoothing layer was deposited by this modified Ru ALD process.

In another embodiment of this invention the smoothing layer 140 is alumina ($Al_2O_3$) formed by ALD instead of the Ru ALD layer. In this embodiment there is no need for the Ru seed layer 130, so the alumina smoothing layer 140 can be formed directly on the metal or metal alloy sidewall gap layers 122, 124 and bottom leading gap layer 124, preferably to a thickness between 1-5 nm. One well-known alumina ALD process uses trimethylaluminum (TMA) and $H_2O$ to form alumina. See S. M. George, "Atomic Layer Deposition: An Overview", Chem. Rev. 2010, 110, 111-131.

Figure 5:
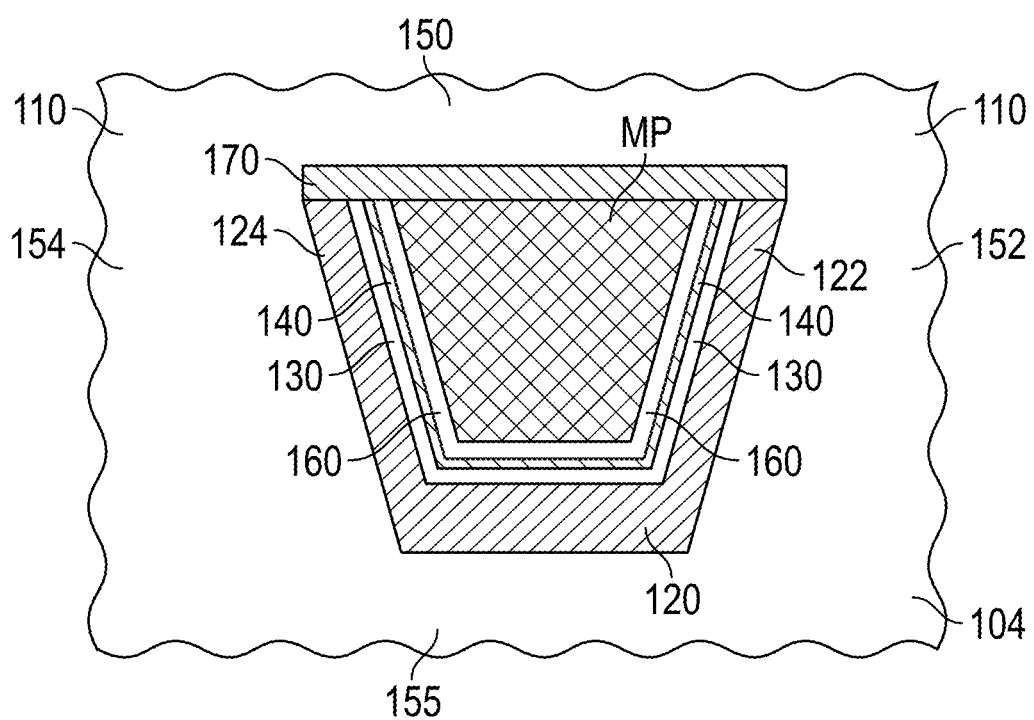
FIG. 5 is a sectional schematic view of the completed MP.

FIG. 5 is a sectional schematic view of the completed MP. A metallic pole seed layer 160, such as a NiCr/CoFe bilayer, is deposited on the Ru or alumina smoothing layer 140. The ferromagnetic MP material, typically CoFe, is then electroplated onto the pole seed layer 160. After chemical-mechanical polishing (CMP), the nonmagnetic trailing gap layer 170 is formed over the MP and the trailing shield 150 of soft magnetic material is formed over the trailing gap layer 170 and side shields 152, 154.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A method for depositing a layer of material in a substrate having a trench with a bottom and outwardly sloped sidewalls comprising:
depositing into the trench, by ionized physical vapor deposition, material selected from a metal and a metal alloy to form a bottom layer of said material and sidewall layers of said material, wherein said sidewall layers are thinner than said bottom layer;
depositing a seed layer of ruthenium (Ru) on said bottom layer and said sidewall layers; and
depositing a smoothing layer of Ru on said Ru seed layer by atomic layer deposition using $RuO_4$ and $H_2$, wherein the $RuO_4$ acts as a precursor that reduces to $RuO_2$ on said Ru seed layer and the $H_2$ acts to reduce $RuO_2$ to Ru.

2. The method of claim 1 wherein said material is selected from a NiNb alloy, a NiTa alloy and a NiCr alloy.

3. The method of claim 1 wherein the thickness of said bottom layer is at least 1.5 times as thick as the thickness of said sidewall layers.

4. The method of claim 1 wherein said sidewall layers have a surface substantially rougher than the surface of said bottom layer, wherein the Ru seed layer substantially replicates the surface of said sidewall layers, and further comprising, after the $RuO_2$ has formed on the Ru seed layer, continuing to introduce $RuO_4$.

5. The method of claim 1 wherein said sidewall layers have a surface substantially rougher than the surface of said bottom layer, wherein the Ru seed layer substantially replicates the surface of said sidewall layers, and further comprising, after the $RuO_2$ has formed on the Ru seed layer, delaying the introduction of $H_2$.

6. The method of claim 1 further comprising depositing a metallic pole seed layer comprising Co and Fe on the Ru smoothing layer and electroplating a ferromagnetic pole layer comprising Co and Fe on the pole seed layer.

7. A method for forming a main pole of a magnetic recording disk drive write head comprising:
providing a substrate having a trench with a bottom and outwardly sloped sidewalls;
depositing into the trench, by ionized physical vapor deposition, material selected from a nonmagnetic metal and a nonmagnetic metal alloy to form a bottom layer of said material and sidewall layers of said material, said sidewall layers having a thickness and said bottom layer is having a thickness at least 1.5 times the thickness of said sidewall layers;
depositing a seed layer of ruthenium (Ru) on said bottom layer and said sidewall layers;
depositing a smoothing layer of Ru on said Ru seed layer by atomic layer deposition using $RuO_4$ and $H_2$, wherein the $RuO_4$ acts as a precursor that reduces to $RuO_2$ on said Ru seed layer and the $H_2$ acts to reduce $RuO_2$ to Ru;
depositing a metallic pole seed layer comprising Co and Fe on the Ru smoothing layer; and
electroplating a ferromagnetic pole layer comprising Co and Fe on the pole seed layer.

8. The method of claim 7 wherein said material is selected from a NiNb alloy, a NiTa alloy and a NiCr alloy.

9. The method of claim 7 wherein said sidewall layers have a surface substantially rougher than the surface of said bottom layer, wherein the Ru seed layer substantially replicates the surface of said sidewall layers, and further comprising, after the $RuO_2$ has formed on the Ru seed layer, continuing to introduce $RuO_4$.

10. The method of claim 7 wherein said sidewall layers have a surface substantially rougher than the surface of said bottom layer, wherein the Ru seed layer substantially replicates the surface of said sidewall layers, and further comprising, after the $RuO_2$ has formed on the Ru seed layer, delaying the introduction of $H_2$.

11. The method of claim 7 wherein providing a substrate comprises providing a substrate formed of ferromagnetic material selected from alloys of two or more of Ni, Fe and Co.

12. A method for depositing a layer of material in a substrate having a trench with a bottom and outwardly sloped sidewalls comprising:
depositing into the trench, by ionized physical vapor deposition, material selected from a metal and a metal alloy to form a bottom layer of said material and sidewall layers of said material, wherein said sidewall layers are thinner than said bottom layer;

depositing a smoothing layer of $Al_2O_3$ on said bottom layer and said sidewall layers by atomic layer deposition, said $Al_2O_3$ smoothing layer having a thickness greater than or equal to 1 nm and less than 5 nm; and depositing a metallic pole seed layer comprising Co and Fe on the $Al_2O_3$ smoothing layer and electroplating a ferromagnetic pole layer comprising Co and Fe on the pole seed layer.

* * * * *